(12) United States Patent
Hanno et al.

(10) Patent No.: US 11,089,639 B2
(45) Date of Patent: Aug. 10, 2021

(54) NETWORK SUBSCRIPTION FOR A NEW DEVICE

(71) Applicant: VODAFONE IP LICENSING LIMITED, Newbury (GB)

(72) Inventors: Kareem Hanno, Newbury (GB); Mohamed Shadoufa, Newbury (GB); Edmund Wontner, Newbury (GB)

(73) Assignee: VODAFONE IP LICENSING LIMITED, Newbury (GB)

( * ) Notice: Subject to any disclaimer, the term of this patent is extended or adjusted under 35 U.S.C. 154(b) by 98 days.

(21) Appl. No.: 15/548,491

(22) PCT Filed: Feb. 4, 2016

(86) PCT No.: PCT/GB2016/000025
§ 371 (c)(1),
(2) Date: Aug. 3, 2017

(87) PCT Pub. No.: WO2016/124884
PCT Pub. Date: Aug. 11, 2016

(65) Prior Publication Data
US 2018/0242380 A1     Aug. 23, 2018

(30) Foreign Application Priority Data

Feb. 6, 2015 (GB) .................................... 1501974

(51) Int. Cl.
*H04W 8/18*    (2009.01)
*H04W 8/20*    (2009.01)
*H04W 76/11*   (2018.01)

(52) U.S. Cl.
CPC ............. *H04W 76/11* (2018.02); *H04W 8/18* (2013.01); *H04W 8/183* (2013.01); *H04W 8/205* (2013.01)

(58) Field of Classification Search
CPC ....... H04W 76/11; H04W 8/18; H04W 8/183; H04W 8/205
See application file for complete search history.

(56) References Cited

U.S. PATENT DOCUMENTS

| | | | | |
|---|---|---|---|---|
| 6,603,968 B2 * | 8/2003 | Anvekar | ............... | H04W 8/183 455/433 |
| 7,912,464 B2 * | 3/2011 | Jiang | ....................... | H04W 8/26 455/432.1 |
| 8,073,426 B2 * | 12/2011 | Ishikawa | ............... | H04W 12/04 370/338 |

(Continued)

FOREIGN PATENT DOCUMENTS

| | | |
|---|---|---|
| EP | 2150026 A1 | 2/2010 |
| EP | 2632196 A1 | 8/2013 |

(Continued)

OTHER PUBLICATIONS

International Search Report and Written Opinion issued in PCT/GB2016/000025 dated Apr. 14, 2016.
Search Report issued in GB1501974.8 dated Jul. 24, 2015.

*Primary Examiner* — Huy D Vu
*Assistant Examiner* — Bailor C. Hsu
(74) *Attorney, Agent, or Firm* — Workman Nydegger

(57) ABSTRACT

Method and system for initiating a network configuration for a device and for managing devices comprising receiving an indication that the device has connected with a subscriber network. Determining the subscriber network identity. Determining the first subscriber module identifier. Providing the device with a web landing page specific to a set of parameters including the subscriber network identity and the first subscriber module identifier, wherein the web landing page initiates network configuration for the device.

18 Claims, 5 Drawing Sheets

(56) References Cited

U.S. PATENT DOCUMENTS

| | | | |
|---|---|---|---|
| 8,095,132 B2 * | 1/2012 | Cheng | H04W 8/265 379/433.09 |
| 8,606,318 B2 * | 12/2013 | Lee | H04L 63/0853 455/558 |
| 8,768,314 B2 * | 7/2014 | Chien | G06F 21/6254 380/274 |
| 9,392,457 B2 * | 7/2016 | Laden | H04W 12/06 |
| 9,401,735 B2 * | 7/2016 | Petersson | H04B 1/3816 |
| 9,532,208 B2 * | 12/2016 | Camilleri | H04W 8/26 |
| 9,941,954 B2 * | 4/2018 | Shi | H04L 49/555 |
| 10,051,544 B2 * | 8/2018 | Chau | H04W 48/18 |
| 2004/0192386 A1 * | 9/2004 | Aerrabotu | H04M 15/00 455/558 |
| 2006/0080404 A1 * | 4/2006 | Haber-Land-Schlosser | G06Q 10/10 709/218 |
| 2008/0020755 A1 * | 1/2008 | Liu | H04W 8/245 455/432.1 |
| 2008/0020773 A1 * | 1/2008 | Black | H04W 8/183 455/445 |
| 2009/0234858 A1 * | 9/2009 | Taylor | G06F 16/958 |
| 2011/0154213 A1 * | 6/2011 | Wheatley | G06F 3/0481 715/738 |
| 2011/0294472 A1 * | 12/2011 | Bramwell | H04W 40/244 455/413 |
| 2012/0106429 A1 * | 5/2012 | Hong | H04W 48/10 370/312 |
| 2012/0264427 A1 | 10/2012 | Adatia et al. | |
| 2014/0024361 A1 | 1/2014 | Poon et al. | |
| 2014/0120925 A1 * | 5/2014 | Kanthala | H04W 72/04 455/450 |
| 2014/0214671 A1 * | 7/2014 | Desilva | G06Q 20/383 705/44 |
| 2014/0243045 A1 | 8/2014 | Siquenique | |
| 2016/0255567 A1 * | 9/2016 | Petersson | H04W 8/12 455/432.1 |
| 2017/0201876 A1 * | 7/2017 | Tamagawa | G06Q 50/32 |

FOREIGN PATENT DOCUMENTS

| | | |
|---|---|---|
| WO | 2013097177 A1 | 7/2013 |
| WO | 2013171648 A1 | 11/2013 |

* cited by examiner

NETWORK SUBSCRIPTION FOR A NEW DEVICE

CROSS REFERENCE TO RELATED APPLICATIONS

This application is a U.S. Nationalization of PCT Application Number PCT/GB2016/000025, filed on Feb. 4, 2016, which claims priority to UK Patent Application No. 1501974.8 filed on Feb. 6, 2015, the entireties of which are incorporated herein by reference.

FIELD OF THE INVENTION

The present invention relates to a method and system for initiating the configuration of mobile devices so that they may subscribe to a subscriber network.

BACKGROUND OF THE INVENTION

Consumer Device Manufacturers or Original Equipment Manufacturers (OEMs) who produced devices that require mobile connectivity would like to make it easier for their customers to connect to a network (e.g. the internet) shortly after acquiring the device. OEMs may distribute their devices to many different countries. One way of providing their customers with a simple "out of the box" experience is to ship devices with a traditional SIM that will immediately work in the end user's country. This requires purchasing SIMs from different companies (OpCos) specific to each country or region and so requires a prediction of how many devices will be sold in each country. This prediction can be difficult because the reaction of the market to each device may be different, especially in light of alternative options provided by competitors.

Additionally, devices may be re-shipped between countries and so the devices may contain a SIM that is not suitable for the eventual country. As a result, re-shipping devices to another country may lead to SIMs that don't work (and can result in a very negative customer experience) or require devices to be shipped back to a factory to un-pack the devices, remove the wrong SIM, install a correct SIM, pack the devices and then ship them to the new country. This can lead to additional costs and lost time for the OEM.

One possible solution is to provide OEMs with SIMs that can work in any country and that preferably provide data services within the same price margin of the target country as a country-specific SIM (e.g. www.worldsim.com). However, this can raise a number of technical and legal challenges because of the following requirements:

There are different legal requirements for consumer registration in each country;

There is a legal requirement to be able to intercept communication (legal interception);

There are different content filtering rules for consumers in each country;

The internet break out experience in each country is different;

The top-up and billing aspects of operating companies (OpCos) is different from each other so a top-up voucher from one OpCo will not work in any other OpCo; and The customer care, SIM swap, and all legal and technical aspects for OpCos are built specifically to support the SIMs of that OpCo and any minor change in these systems will be very expensive and will take a lot of time to complete.

Therefore, there is required a method and system that overcomes these problems.

SUMMARY OF THE INVENTION

Against this background there is provided a method and system that allow products or devices (e.g. tablets, e-readers, laptop computers, vehicle communication systems, home automation systems, etc.) that require network connectivity (e.g. to a subscriber network or internet connectivity over a cellular network) to be delivered to customers together with a SIM or other subscriber module. The devices may have a subscriber identity that can switch or transform from an initial identity to a final identity (manually or automatically). This may be by swapping the subscriber module or by using a single subscriber module with a transformable identifier. When the end user powers the device for the first time (or powers on or connects a further time before subscriber identity transformation, for example) then it connects to a local subscriber network (e.g. a local cellular network). As the subscriber identity has not yet transformed then this initial connection may be a roaming connection, for example (the initial subscriber module identifier may include a subscriber network identifier different to local subscriber network that the SIM is in communication with).

The user may have previously connected but the process may not have completed for some reason. Therefore, the process may restart from where it left off. For example, the SIM may still have its initial identity (not yet transformed).

Upon initial connection (or reconnection before the process completes and/or with the SIM having its initial identity) the device may make a request to register the user or other indication that the device has connected with a subscriber network, access a network (e.g. the subscriber network or the internet) or request to become a subscriber of the network. Together with or within this received indication or request is included the initial or first subscriber network identifier (e.g. IMSI of the initial SIM identifier). Other information may be included such as a unique identifier of the device (e.g. IMEI).

The first subscriber network identifier may be registered within a system for managing devices or may be included in a range of identities provided to the system in advance. This information may be registered together with the subscriber network identity (e.g. a particular OpCo). Particular identifiers (or ranges of identifiers) may be associated with a particular web landing page (or instructions for configuring or building a web landing page). Therefore, when the indication or request is received the system can determine what particular web landing page to send to the device. Preferably, this web landing page only needs to be sent once (i.e. before transformation) to initiate network configuration of the device. Network configuration may involve different steps or processes for each OpCo (or for different countries where particular OpCos operate). These different steps may be included in the functionality of the web landing page.

For example in Spain, transformation of the subscriber identity of the device may require a physical replacement of the subscriber module or SIM. Therefore, the web landing page that matches parameters derived from the device and/or message can provide instructions to the user to visit a store to replace the SIM. In other countries the subscriber module is allowed to be transformable within the device (i.e. no replacement is needed as the device can transform the subscriber module from a first subscriber module identifier to a second subscriber module identifier) with no or few user details being required or registered. In some countries the user's name or other specific details are required or registered before this transformation is allowed.

Therefore, the web landing page can be configured to meet specific local requirements that match the subscriber network (and/or country) where the device will operate.

According to a first aspect there is provided a method and system for initiating a network configuration for a device, the method comprising the steps of:

receiving from a device an indication that the device has connected with, request to access, register with and/or become a subscriber of a subscriber network;

determining the subscriber network identity;

determining a first (or only) subscriber module identifier;

providing the device with a web landing page specific to a set of parameters including the subscriber network identity and the first subscriber module identifier, wherein the web landing page initiates network configuration for the device. Therefore, one web landing page can be customised or made for a particular device that uses a first subscriber module identifier (or group of devices with a particular set of first subscriber module identifiers) and particular subscriber network. Therefore, the network configuration can be tailored for a particular device type, network where the device will operate, and/or country of operation. This can aid usability of the device and simplify the set-up procedure. This can be further beneficial before subscriber identity transformation as the registration procedure may operate whilst the device is effectively roaming and a simplified set-up will require less data or time on a roaming network. Initiating the network configuration may start a procedure for configuring the device to access the network and may also proceed to complete the configuration enabling network access. Providing access to the subscriber network and network configuration may comprise registering the device and/or user with the subscriber network. The indication received from the device may be an explicit or implicit request to become a subscriber. For example, the request may take the form of a brief signal or message that the device has been initiated and connected to the network (communicate with a network base station) for the first time, at a time before registration as a subscriber to the network has taken place and/or before transformation of the subscriber identity (e.g. SIM identity).

Preferably, the subscriber network access request or indication of connection is received over that same subscriber network. The subscriber network identity may be determined from the carrier details. The subscriber network identity may be determined from the subscriber module of the device. If the indication or request was made over a different network then access may be denied (or registration may fail).

Optionally, the method may further comprise the step of determining a unique device identifier, wherein the set of parameters further includes the unique device identifier and/or the country of the subscriber network. In other words, the particular web landing page may be matched against device id (or determined to fall within a range of device ids), device id (or determined to fall within a range of device ids), first subscriber module identifier (or determined to fall within a range of first subscriber module identifiers) and subscriber network (that the device is connected to). An advantage of checking the device id is that this can also be used to prevent a user for taking the subscriber module identifier (e.g. SIM) from the supplied device and installing it in another device (perhaps to take advantage of a low data rate tariff). When the device id doesn't match any stored id or range of ids then an error message may replace the web landing page (or a web landing page is provided that prevents configuration of the device with the network or prevents registration, for example).

Preferably, the provided web landing page may indicate an action to be taken by a user to transform the subscriber identity from the first subscriber module identifier to the second subscriber module identifier.

Optionally, the device may have a subscriber identity transformable from the first subscriber module identifier to a second subscriber module identifier. The connection is initiated with the first subscriber module identifier. Therefore, at this stage the device is effectively roaming and so not yet a subscriber to the network over. However, this at least provides connectivity to provide the web landing page and subsequent subscription and/or registration.

Preferably, the method may further comprise the step of subscribing the device to the subscriber network by transforming the subscriber identity from the first subscriber module identifier to the second subscriber module identifier, wherein the second subscriber module identifier belongs to (or contains an identifier of) the subscriber network.

Optionally, the indicated action may be replacement of a subscriber module. In other words, the web landing page may prompt the user to physically change or swap their subscriber module (e.g. SIM). This may be done by themselves or within a store (the user may be prompted to visit a store). In a store environment the store may carry out identity and other checks and register the user and/or device, for example.

Optionally, the subscriber identity of the device may be stored within a subscriber module that has a transformable subscriber module identifier. This may be a transformable subscriber module (e.g. SIM) that stores more than one identifier.

Optionally, initiating the network configuration of the device may further comprise the step of transforming the subscriber module identifier within the subscriber module from the first subscriber module identifier to the second subscriber module identifier. The subscriber module may receive a signal or command to transform whilst remaining installed within the device. This may be part of a registration process (with the subscriber network) or separate from this process. No physical replacement of the subscriber module (e.g. SIM) is required in this embodiment.

Optionally, the method may further comprise the step of preventing the web landing page from being provided to the device if the subscriber module identifier has transformed from the first subscriber module identifier to the second subscriber module identifier. Therefore, a check can be made to confirm that the transformation hasn't taken place before the web landing page is provided. This check can be made at any point but preferably directly after the indication or request to subscribe to the network is received.

Preferably, the provided web landing page may provide any one or more of:

a user registration facility to access the network;

functionality to transform a subscriber module identity of the device from the first subscriber module identifier to the second subscriber module identifier;

pricing information for accessing the network;

information in a language specific to a country of the first subscriber network;

instructions for configuring the device to subscribe to the subscriber network; and logic to configure the device to subscribe to the subscriber network. The web landing page may include other information or functionality. Preferably, the web landing page is displayed on a browser of the device.

Preferably, the step of providing the device with a web landing page may further comprise the steps of configuring the web landing page by modifying a template landing page. This simplifies the building of the page. However, different versions of the web landing page may be stored and selected instead.

Preferably, configuring the web landing page may further comprise the step of determining a set of configuration instructions. Scripts, configuration files, database parameters or other elements may form the configuration instructions, for example.

Optionally, the set of configuration instructions may be selected based on the first subscriber module identifier falling within a range of subscriber module identifiers.

Preferably, the subscriber module identifier of the device may be an IMSI. Other identifiers may be used.

Preferably, the method may further comprise the step of registering the device with an operating company of the subscriber network. The use may also be registered with the device.

Preferably, the device may be registered with the operating company via the landing page. This may be achieved over the internet, for example.

Preferably, the web landing page initiates or enables access to the internet over the subscriber network.

The method described above may be implemented as a system (computer, network, server or group of computers) that implement the method or any described variation in the method.

According to a second aspect there is provided a system for managing a plurality of devices (preferably, each device having a subscriber identity transformable from a first subscriber module identifier to a second subscriber module identifier), the system comprising logic configured to:

receive data defining one or more first subscriber module identifiers;

store a set of one or more parameters including the data defining the one or more first subscriber module identifiers and a subscriber network identity;

receive a configuration of a web landing page; and associate the configuration of the web landing page with the stored set of one or more parameters. This system may provide an interface for receiving the data and a data store for saving the data, parameters, web landing page(s) and configurations. The configuration of the web landing page may be used to configure one or more template landing pages or may be multiple versions (with different attributes) of web landing pages themselves, for example.

Preferably, the logic may be further configured to:

receive data defining one or more device identifiers and the stored set of parameters may further include the data defining the one or more device identifiers.

Advantageously, the logic may be further configured to:

receive from a device an indication that the device has connected with to subscribe to or otherwise access a subscriber network, wherein the device has a first subscriber module identifier;

match details of the received indication including at least the subscriber network and the first subscriber module identifier of the device with the stored set of parameters; and serve a web landing page to the device configured according to a configuration associated with the matched set of parameters. The indication or request may be an explicit or implicit request to access the network. For example, it may be a message or communication received from the device including data or information about the device where the response is the web landing page configured to match the parameters. The indication or request may include other data or information (e.g. user registration details). The indication or request may be carried by a radio access network (RAN), for example.

Preferably, the details of the received indication to be matched with the stored set of parameters may further include a device identifier (e.g. IMEI, WiFi identifier, MAC address, etc).

Optionally, the logic may be further configured to transform the subscriber module identifier within a subscriber module of the device from the first subscriber module identifier to the second subscriber module identifier. The transformation may be achieved directly or indirectly from the logic (e.g. the device carries out the transformation prompted by the logic).

Preferably, the logic may be further configured to register the device using the web landing page. Some subscriber networks or countries require that successful registration must occur before the transformation can take place.

Preferably, the configuration of the web landing page may be a set of customisation settings for a template web landing page. Alternatively, separate complete stored landing pages may be selected and served. In other words, the initialisation of the network configuration and/or the network configuration procedure itself may be customised by providing a specific web landing page to the device dependent on its particular parameters.

According to a third aspect, there is provided a method for managing a plurality of devices (preferably, each device having a subscriber identity transformable from a first subscriber module identifier to a second subscriber module identifier), the method comprising the steps of:

receiving data defining one or more first subscriber module identifiers;

storing a set of one or more parameters including the data defining the one or more first subscriber module identifiers and a subscriber network identity;

receiving a configuration of a web landing page; and associating the configuration of the web landing page with the stored set of one or more parameters.

Optionally, the method may further comprise the steps of:

receiving from a device an indication that the device has connected with or made a request to subscribe to a subscriber network, wherein the device has a first subscriber module identifier;

matching details of the indication or request including at least the subscriber network and the first subscriber module identifier of the device with the stored set of parameters; and serving a web landing page to the device configured according to a configuration associated with the matched set of parameters.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and nonvolatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
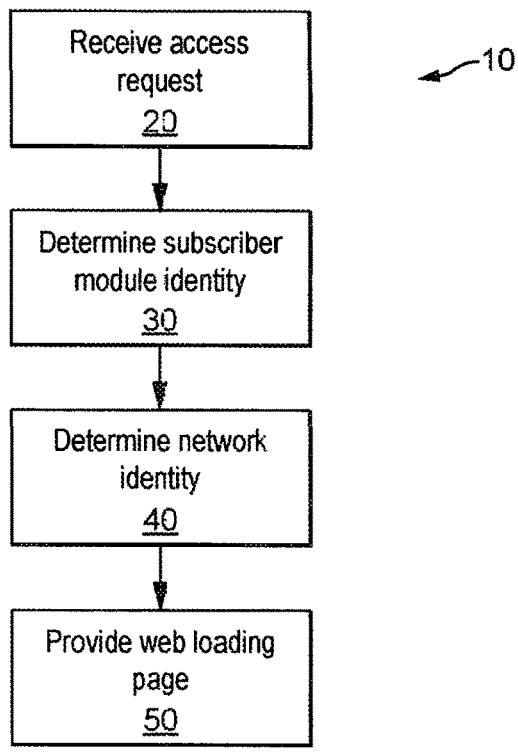
FIG. 1 shows a flowchart of a method for initiating a network configuration for a device.

List of Abbreviations
UE User Equipment which is the device
RAN Radio Access Network
SGSN Serving GPRS Support Node (this node normally belongs to the OpCo where the SIM is located)
GGSN Gateway GPRS Support Node (this node normally belongs to a coordinating OpCo such as Vodafone)
API Application Programming Interface
MSP Multiservice Proxy
GLP Global Landing Page
PDCP Packet Data Convergence Protocol
RANAP Radio Access Network Application Part FIG. 1 shows a flowchart (at a high level) of a method 10 for initiating a network configuration for a device. At step 20 a message is received that requests access to the network. This message may be received over a Radio Access Network (RAN) operated by a subscriber network (e.g. an operating company or OpCo). Whilst FIG. 1 shows a request being made at step 20, this may also be an indication that the device has connected to the network. At step 30 a first subscriber module identifier is determined. This is an initial identity or identifier (e.g. number) of a subscriber module that is transformable from a first identity to a second identity. In this example, the subscriber module is a SIM.

The subscriber network identity (or OpCo) over which the request is received is determined at step 40. At step 50 the device is provided with a web landing page that is specific to the combination of the determined subscriber module identifier (initial identity) and the determined subscriber network identity. Other parameters may also be matched to provide a specific web landing page for that combination. The web landing page may be presented on a screen of the device in a browser or in another form. The web landing page initiates network configuration of the device.

Figure 2:
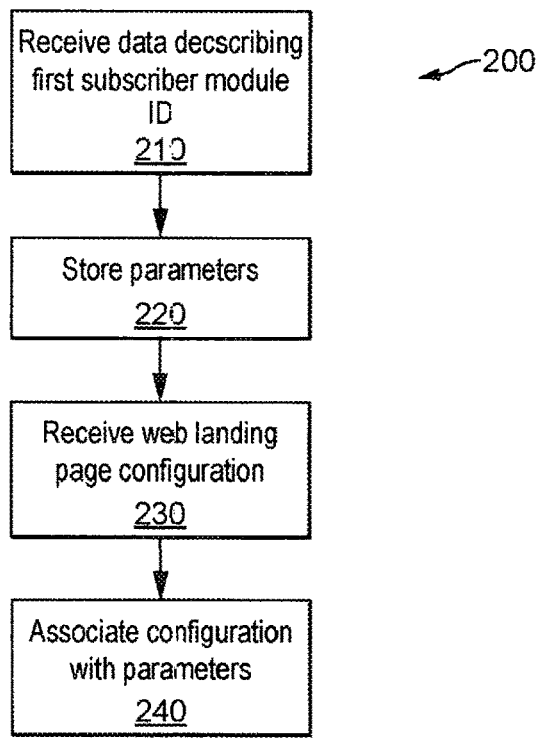
FIG. 2 shows a flowchart of a method for managing a plurality of devices.

FIG. 2 shows a flowchart of a method 200 for managing a plurality of devices. In particular, managing the plurality of device involves setting up configurations of devices or providing facilities for configuring those devices, to access a network such as the internet. At step 210 data is received describing the first or initial subscriber module identifier. This may be a single identifier, a range of identifiers, or a plurality of separate identifiers, for example. At step 220 these subscriber module identifier(s) and a subscriber network identity are included in a set of parameters that are stored.

At step 230 a configuration of a web landing page is received. This is associated with the particular stored set of parameters at step 240. In other words, particular web landing page configurations are stored or associated with particular parameters that include at least one or more first subscriber module identifiers and a subscriber network identity (over which a request to access a network is received according to method 10).

Figure 3:
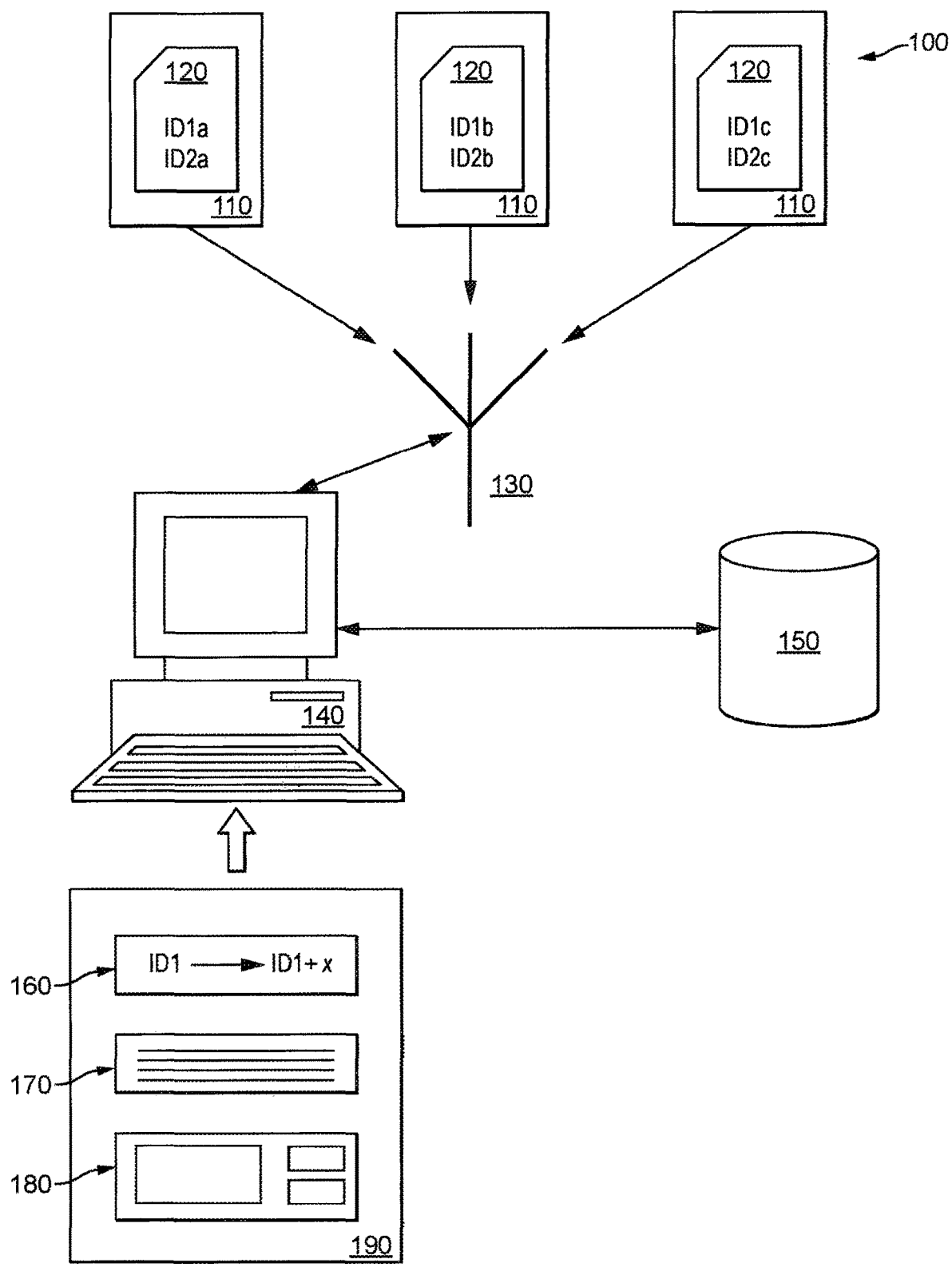
FIG. 3 shows a schematic diagram of a system for managing a plurality of devices, given by way of example only.

FIG. 3 shows a schematic diagram of a system 100 for implementing method 200. One or more devices 110 each include a SIM 120 that is transferable from a first subscriber module identifier (ID1) to a second subscriber module identifier (ID2). Each of these IDs in their separate SIMs 120 are different and unique. When a device 110 having a subscriber module identifier before transformation is first powered on and connects to a subscriber network 130 then this device 110 sends a request to access a network such as the internet. This request is received by a server 140 which may be a simple out of the box experience (SOBE) control engine (SCE) 140. The SCE 140 may also contain or be in communication with a database for storing parameters and configuration parameters for web landing pages described with reference to FIG. 2.

A user or operator within in an OpCo may add SIM identifiers 160, configuration details for web landing pages 170 and templates for the web landing page 180 as a data input 190, which may be stored in the database 150. This same system 100 may then be used to process requests to access the network according to the method 10 described with reference to FIG. 1.

The SCE 140 has the ability to integrate multiple Operating Companies (OpCos) and at the same time and the ability to integrate to multiple SIM transformation services, which allow SIMs 120 to transform from using one OpCo (e.g. a Global OpCo) to another OpCo (e.g. local OpCo).

Once the configuration of the device 110 has been initiated then the SIM transformation may take place. Transforming the SIM from a global to a local SIM allows the ruse of the local OpCo legal interception, content filtering, support and billing systems in this way provides a more consistent user experience, customizable per OpCo and per device, with the same tariff options, across different SIM assets which may belong to different OpCos.

Different operating companies may also specify their own marketing or technical messages in their own language to the customer using the global and local SIM attributes together in a single platform.

The following describes at a high level the various triggers that occur within the process for initiating the network connection.

1. When the SIMs (e.g. machine-to-machine SIMs) are manufactured, the SIM manufacturer produces a return file, which is sent to a provisioning system of GDSP so that the SIMs may be pre-provisioned on a group HLR. This allows the network elements to be ready for the new group SIMs so that they accept a connection from the device whenever the device tries to establish a connection. Furthermore, a target local SIM (i.e. the SIM after transformation) may be pre-provisioned on the target HLRs of the local OpCo.

2. When a customer buys a device, turns it on, and decide to view connection options, they will click on a button in a browser (this is the trigger to establish the Packet Switching Connection which connects to the RAN), and retrieve a first page of the GLP. The first page of the GLP allows the customer to see an available offer or plan. The particular offer or plan that is waiting for the customer may depend on a particular commercial proposition specific to the device and SIM and also on the country where the customer is currently located (or local OpCo).

3. If the customer wishes to proceed with the offer and configure their device accordingly, then they may be required to follow legal steps of registering on the GLP (this may be different for each country). Once registration is completed (or any other local requirements), the SCE may allocate a target local SIM for the customer and may display the information about the target local SIM that is allocated to the customer on the GLP (i.e. completing registration may be a trigger an allocating of the destination/target local SIM).

4. The final page on the GLP may display the SIM information, has a button to start the SIM transformation (the actual text displayed to the customer may be 'activate', for example). Once the customer clicks on the 'activate' button, then SCE will send an API call to G&D to start the actual SIM transformation (so the customer clicking on that button is the trigger to start SIM transformation process). The SIM transformation process may include G&D sending multiple binary messages to the device, which will activate a client on the SIM that is responsible for transforming the SIM. Once the SIM is transformed, it will be able to connect to the local network using the destination/target local SIM because the local destination SIMs were pre-provisioned as part of step 1.

Therefore, accepting the offer leads the customer to be prompted for and/or provide the registration details, assigns a local target SIM and initiates SIM transformation.

Figure 4:
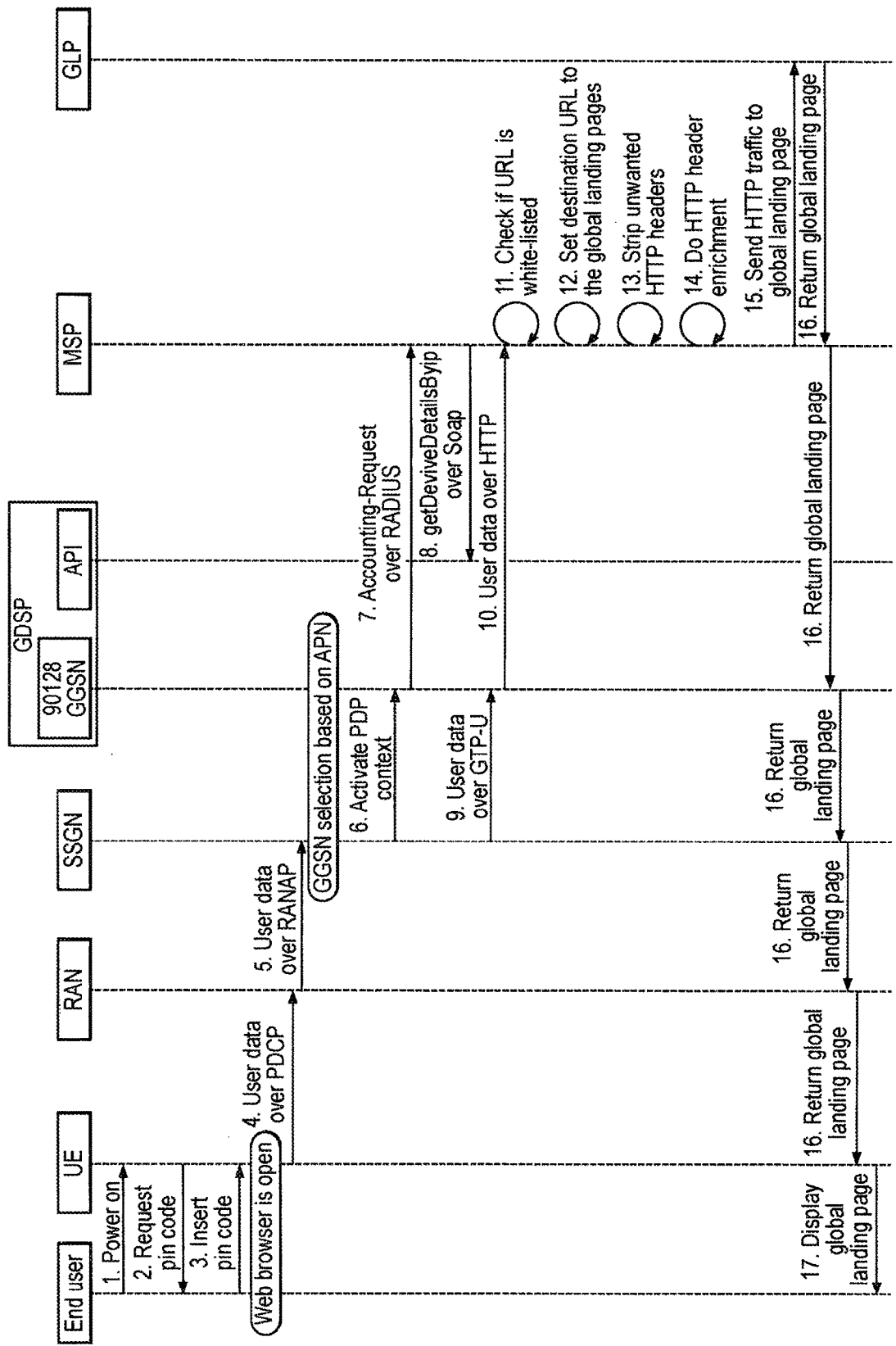
FIG. 4 shows a sequence diagram of a method for providing a device with a web landing page, according to an example.

FIG. 4 shows a sequence diagram of an example method leading to the display of the web landing page on the device. The following steps occur:

1. End user presses the power button and the UE begins to power on;
2. UE is switched on and requests the pin code of the of SOBE SIM card (GDSP SIM);
3. End user inserts pin code;
4. UE opens browser and starts a new data connection to the RAN, over PDCP;
5. RAN sends the user data to the selected SGSN, over RANAP (the user data in this example is the standard set of attributes required to establish a packet switching connection in GSM);
6. SGSN uses the SOBE APN and selects the 90128 GGSN as the gateway. This triggers the PDP context activation and an IP is assigned to the GDSP SIM;
7. The 90128 GGSN sends a RADIUS Accounting-Request to the MSP, which is acting as an AAA accounting server. The RADIUS accounting traffic includes the IP of the device, the IMSI (GDSP SIM) and IMEI which allows the SCE to identify the correct commercial proposition or parameters associated with the connecting device so that the correct web landing page is generated or selected;
8. MSP fetches the information for header enrichment from the GDSP, using a SOAP interface. To fetch the information, the MSP uses the IP address that was received Accounting-Request message of the RADIUS interface. In this step, MSP may get more information about the device (including the OpCo which the SIM is connecting from, and this information is used later on in step 15) from GDSP and may send this information to a web or global landing page generator (GLP);
9. SGSN sends user data to the 90128 GGSN, using the assigned IP address as source IP address;
10. User data reaches the MSP;
11. MSP checks if the destination URL of the incoming HTTP request is white listed. Since the device has recently opened the browser, then the URL might be www.google.com, www.apple.com or something similar (depends on the device), for example. The Database of whitelisted URLs is maintained in MSP and is configured by the operational teams;
12. MSP sets the destination URL to the GLP;
13. Depending on configuration, the MSP platform may strip the HTTP request of some headers;
14. Depending on configuration, the MSP platform may do header enrichment using the information that is stored in the local database for the incoming IP address;
15. MSP sends the HTTP traffic to the GLP;
16. A global landing pages is returned; and
17. The global or web landing page is displayed in the UE.

The association between the user-experience (or response to the request) to be provided to a specific SIM and the actual traffic happens at run time when the customer traffic actually reaches the GLP. This relies on the configuration of the SCE 140. The configuration of the SCE 140 can happen as early as required in the process by specifying the product name and the countries where the product will work, and then a batch of Group SIMs may be added or stored (this is possible once the group SIMs are manufactured and sent to the OEM). The device identifiers (e.g. IMEIs) may be added to the SCE 140 (once the devices are manufactured, and ideally before shipping the devices from the factory). All configurations can happen well in advance of the devices becoming available in the market, which reduces the need to implement manual activities when the devices arrive to the shops.

SCE 140 captures the information about where the device is connecting from in the database 150 and is able to detect when the customer switches country (e.g. the subscriber identity module transforms) in the middle of a registration process. The first and second subscriber identity module may include network and/or country identifiers that may be different pre and post transformation.

Figure 5:
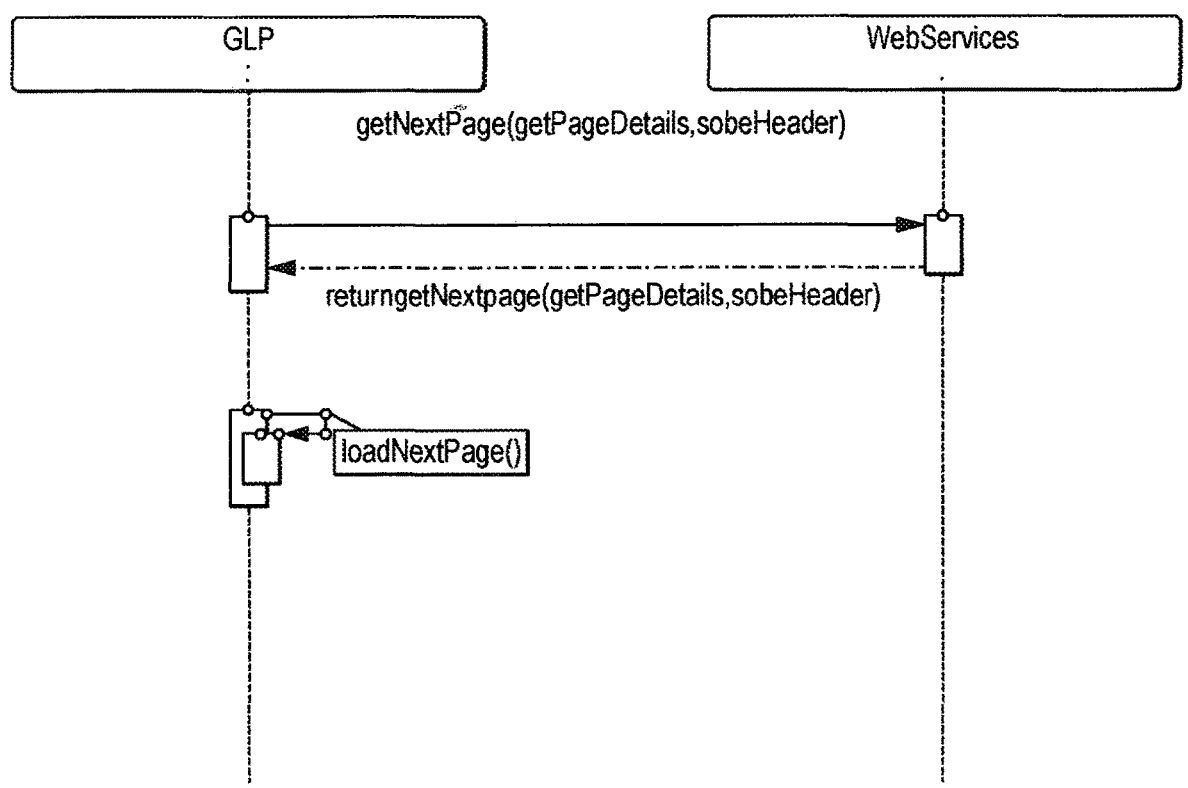
FIG. 5 shows a sequence diagram of a portion of the method of FIG. 4 in further detail.

Displaying the web landing page (Step 16 in the above sequence) relies on the SCE 140. In one example implementation, further functions of the SCE 140 may include:

An http request coming in from the MSP, may be mapped to an intercepting servlet, which may in turn forward it to a controller, which may retrieves any or all information such as IMSI, IMEI, ICCID, etc. from the request, and construct DeviceDetails (shown in FIG. 5). DeviceDetails may then be used as a parameter to getNextPage( ) call to SCE 140.

In this example, this may be done in GLPServlet as follows:
DeviceDetails deviceDetails=new DeviceDetails( );
deviceDetails.setDeviceIMEI(request.getHeader("imei"));
deviceDetails.setSimIMSI(request.getHeader("imsi"));
deviceDetails.setServingOpcoId(request.getHeader("Serving-opco-id"));
deviceDetails.setServingOpcoCode(request.getHeader("Serving-opco-code"));

Various jsp pages in the GLP may be loaded dynamically, based on the user requested actions. This may follow the sequence shown in FIG. 5.

The MSP may also provide a white-listing feature which allows backend services on the devices to reach its target and the customer does NOT see the results of these backend services. For example, Device X may send a message to its servers to check if the device is stolen or not, and the SCE 140 may allow this traffic to work normally by white-listing the target IP on MSP.

The above interactions preferably occur before SIM transformation (while the SIM is still a GDSP SIM-ID1). Once SIM transformation happens, the SIM becomes a local SIM (ID2) and will go to the local OpCo landing page directly like other normal OpCo SIMs, without passing through the above process or the SCE 140.

Figure 6:
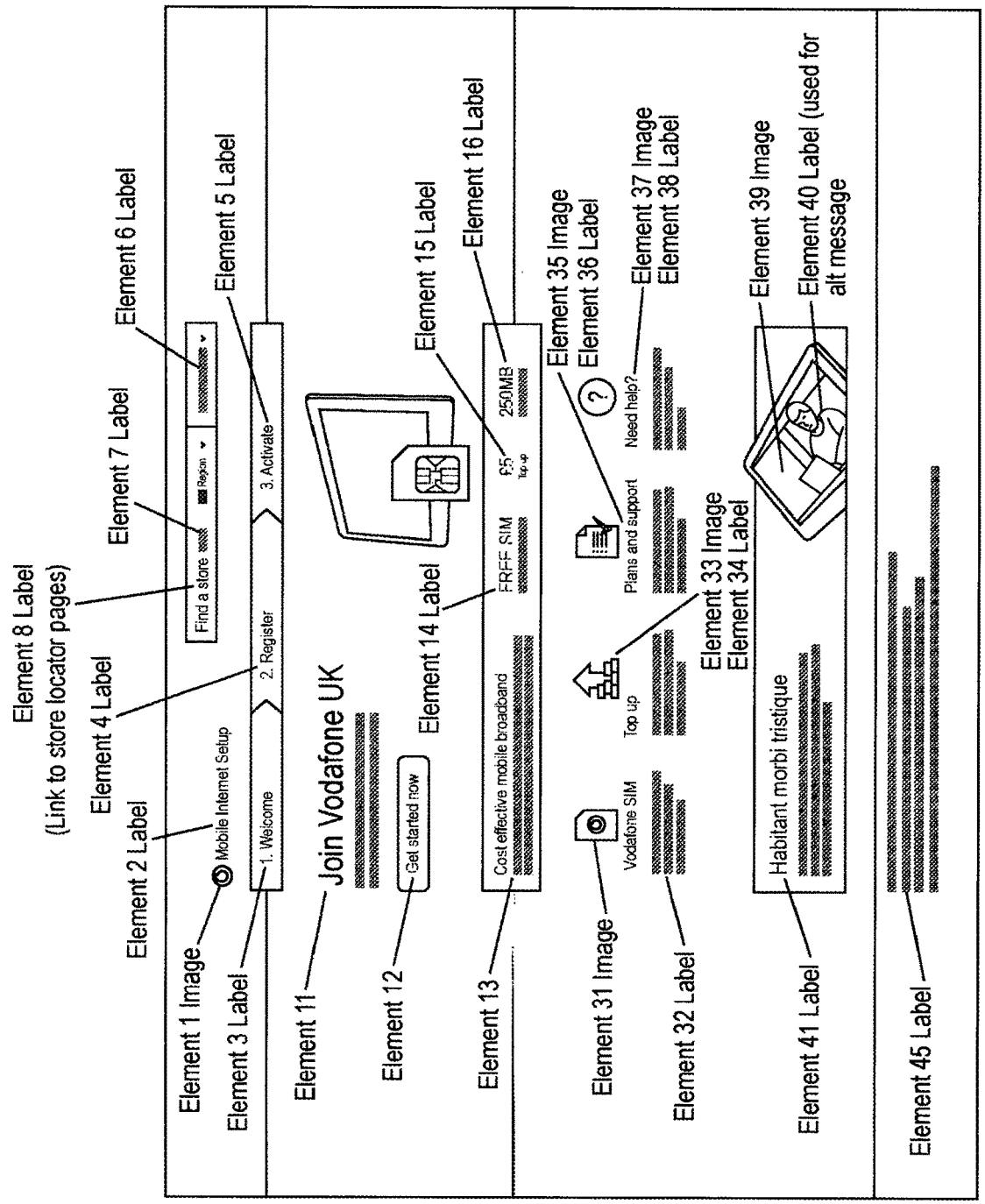
FIG. 6 shows a screen-shot of an example web landing page.

FIG. 6 shows a screen shot of an example web landing page. This figure highlights features that may be customised including text, images, data tariffs, buttons and functions.

As will be appreciated by the skilled person, details of the above embodiment may be varied without departing from the scope of the present invention, as defined by the appended claims.

For example, other parameters may be included when matching a web landing page or configuring a web landing page. Instead of registering the pre-transform subscriber module identifier (SIM ID), the post-transformation subscriber module identifier (or range of post-transform identifiers) may be used as the stored parameters or to determine and serve the web landing page (or otherwise configure the web landing page). The web landing page may have different offers for different devices and/or OpCos. For example, the different offers may include any one or more of free data for a period of time (e.g. one week), a specific data quota (e.g. 100 MB per month), pricing plan for data (e.g. £1/10 MB), etc.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for initiating a network configuration for a device, the method comprising:
   determining a subscriber network identity of a subscriber network;
   receiving a request to connect to the subscriber network, the request originating from a device comprising a subscriber identification module (SIM) whose identity, which is used to connect to the subscriber network, is transformable between a first identity and a second identity such that the first identity is transformable into the second identity and such that the first identity, after being transformed, is no longer available absent another transformation being performed, the SIM being transformable from a global SIM to a local SIM;
   after the request is received, checking to determine whether the identity of the SIM previously underwent an identity transformation in which the first identity was transformed into the second identity;
   after performing said checking and in response to determining the identity of the SIM previously has transformed from the first identity to the second identity, preventing a web landing page from being provided to the device, the web landing page being configured to initiate a network configuration of the device with the subscriber network;
   after performing said checking and in response to determining the identity of the SIM previously has not transformed from the first identity to the second identity, providing the web landing page to the device, wherein the provided web landing page is specific to a matched combination of the first identity and the subscriber network identity, and
   wherein the provided web landing page is configured to trigger the identity of the SIM to transform from the first identity into the second identity and the global SIM to the local SIM such that the provided web landing page facilitates the network configuration of the device with the subscriber network; and
   prior to the identity of the SIM transforming from the first identity to the second identity, whitelisting a backend service on the device such that traffic generated by the backend service is allowed to be transmitted to a target server in the subscriber network.

2. The method of claim 1, wherein an indication is received over the subscriber network to determine that the device is currently connected.

3. The method of claim 1, further comprising:
   determining a unique device identifier, wherein a set of parameters, which are provided to the device, includes the unique device identifier or a country of the subscriber network.

4. The method of claim 1, further comprising:
   subscribing the device to the subscriber network by triggering the SIM to transform the first identity into the second identity, wherein the second identity belongs to the subscriber network.

5. The method of claim 1, wherein the SIM of the device is stored within a subscriber module that has a transformable subscriber module identifier.

6. The method of claim 5, wherein the web landing page visually displays a link to a store indicator page.

7. The method according to claim 1, further comprising preventing the web landing page from being provided to the device if the SIM has already transformed the first identity into the second identity.

8. The method according to claim 1, wherein the provided web landing page provides any one or more of:
   a user registration facility to access the subscriber network;
   functionality to transform the SIM of the device from the first identity to the second identity;
   pricing information for accessing the subscriber network;
   information in a language specific to a country of the subscriber network;
   instructions for configuring the device to subscribe to the subscriber network; and
   logic to configure the device to subscribe to the subscriber network.

9. The method according to claim 1, wherein providing the device with the web landing page further comprises configuring the web landing page by modifying a template landing page.

10. The method of claim 9, wherein configuring the web landing page further comprises determining a set of configuration instructions.

11. The method according to claim 1, further comprising registering the device with an operating company of the subscriber network.

12. The method of claim 11, wherein the device is registered with the operating company via the web landing page.

13. The method according to claim 1, wherein the web landing page enables Internet access over the subscriber network.

14. A system for managing a plurality of devices, the system comprising
   one or more processors; and
   one or more hardware storage devices that store computer-executable logic that is executable by the one or more processors to cause the system to at least:
      determine a subscriber network identity of a subscriber network;
      receive a request to connect to the subscriber network, the request originating from a device comprising a subscriber identification module (SIM) whose identity, which is used to connect to the subscriber network, is transformable between a first identity and a second identity such that the first identity is transformable into the second identity and such that the first identity, after being transformed, is no longer available absent another transformation being performed, the SIM being transformable from a global SIM to a local SIM;
      after the request is received, check to determine whether the identity of the SIM previously underwent an identity transformation in which the first identity was transformed into the second identity;
      after performing said checking and in response to determining the identity of the SIM previously has transformed from the first identity to the second identity, prevent a web landing page from being provided to the device, the web landing page being configured to initiate a network configuration of the device with the subscriber network;
      after performing said checking and in response to determining the identity of the SIM previously has not transformed from the first identity to the second identity, provide the web landing page to the device, wherein the provided web landing page is specific to a matched combination of the first identity and the subscriber network identity, and
      wherein the provided web landing page is configured to trigger the identity of the SIM to transform from the first identity into the second identity and the global SIM to the local SIM such that the provided web landing page facilitates the network configuration of the device with the subscriber network; and
      prior to the identity of the SIM transforming from the first identity to the second identity, whitelist a backend service on the device such that traffic generated by the backend service is allowed to be transmitted to a target server in the subscriber network.

15. The system of claim 14, wherein the logic is further configured to:
   receive data defining one or more device identifiers and a stored set of parameters.

16. The system according to claim 14, wherein the web landing page visually displays a link to a store indicator page.

17. A method for managing a configuration of a device, said method comprising:
   determining a subscriber network identity of a subscriber network;
   receiving a request to connect to the subscriber network, the request originating from a device comprising a subscriber identification module (SIM) whose identity, which is used to connect to the subscriber network, is transformable between a first identity and a second identity such that the first identity is transformable into the second identity and such that the first identity, after being transformed, is no longer available absent another transformation being performed, the second identity belonging to the subscriber network, the SIM being transformable from a global SIM to a local SIM;
   after the request is received, checking to determine whether the identity of the SIM previously underwent an identity transformation in which the first identity was transformed into the second identity;
   after performing said checking and in response to determining the identity of the SIM previously has transformed from the first identity to the second identity, preventing a web landing page from being provided to the device, the web landing page being configured to initiate a network configuration of the device with the subscriber network;
   after performing said checking and in response to determining the identity of the SIM previously has not transformed from the first identity to the second identity, providing the web landing page to the device, wherein the provided web landing page is specific to a matched combination of the first identity and the subscriber network identity, and
   wherein the provided web landing page is configured to trigger the identity of the SIM to transform from the first identity into the second identity and the global SIM to the local SIM such that the provided web landing page facilitates the network configuration of the device with the subscriber network; and
   prior to the identity of the SIM transforming from the first identity to the second identity, whitelisting a backend service on the device such that traffic generated by the backend service is allowed to be transmitted to a target server in the subscriber network.

18. The method of claim 17, wherein the web landing page is configured to meet a determined set of local requirements that match the subscriber network where the device is to operate.

* * * * *